(12) United States Patent
Feng et al.

(10) Patent No.: US 9,151,159 B2
(45) Date of Patent: Oct. 6, 2015

(54) TRACTION-TYPE ACTUATOR

(71) Applicant: FENG & WANG TECHNOLOGY CO., LTD., Taoyuan County (TW)

(72) Inventors: Chin-Hsing Feng, Taoyuan County (TW); Jii-Chyun Wang, Taoyuan County (TW)

(73) Assignee: FENG & WANG TECHNOLOGY CO., LTD., Taoyuan County (TW)

( * ) Notice: Subject to any disclaimer, the term of this patent is extended or adjusted under 35 U.S.C. 154(b) by 107 days.

(21) Appl. No.: 13/955,219

(22) Filed: Jul. 31, 2013

(65) Prior Publication Data
US 2014/0035290 A1 Feb. 6, 2014

(30) Foreign Application Priority Data
Aug. 1, 2012 (TW) .............................. 101127784 A

(51) Int. Cl.
*F01B 3/00* (2006.01)
*H02K 7/18* (2006.01)
*F16H 19/06* (2006.01)

(52) U.S. Cl.
CPC .............. *F01B 3/00* (2013.01); *F16H 19/0604* (2013.01); *H02K 7/1853* (2013.01); *H02K 7/1861* (2013.01)

(58) Field of Classification Search
CPC ......... F03G 7/10; F16H 19/0604; F01B 3/00; H02K 7/1853; H02K 7/1861
USPC ......................................................... 290/1 R
See application file for complete search history.

(56) References Cited

U.S. PATENT DOCUMENTS

| | | | | |
|---|---|---|---|---|
| 5,157,922 A * | 10/1992 | Baruch | ............................. | 60/325 |
| 5,355,674 A * | 10/1994 | Rosenberg | ....................... | 60/325 |
| 7,005,757 B2 * | 2/2006 | Pandian | ......................... | 290/1 R |
| 7,777,359 B1 * | 8/2010 | Gibson | ............................ | 290/54 |
| 8,011,182 B2 * | 9/2011 | Hastings | .......................... | 60/496 |
| 8,456,028 B1 * | 6/2013 | Chan et al. | ...................... | 290/1 R |
| 8,541,894 B2 * | 9/2013 | Blevins | ........................... | 290/1 R |
| 2003/0035712 A1 * | 2/2003 | Hopper et al. | .................. | 414/787 |
| 2004/0160058 A1 * | 8/2004 | Gott et al. | ....................... | 290/1 R |
| 2006/0163876 A1 * | 7/2006 | Eskandr | .......................... | 290/1 R |
| 2007/0278800 A1 * | 12/2007 | Galich | ............................ | 290/1 R |
| 2011/0049906 A1 * | 3/2011 | Hughes et al. | ................. | 290/1 C |
| 2011/0187125 A1 * | 8/2011 | Jang | ............................... | 290/1 C |
| 2011/0234256 A1 * | 9/2011 | Fuse | ........................ | 324/764.01 |
| 2011/0266813 A1 * | 11/2011 | Horton et al. | .................. | 290/1 R |
| 2011/0285147 A1 * | 11/2011 | Fyke et al. | ...................... | 290/1 R |
| 2012/0153635 A1 * | 6/2012 | Tsivicos | ......................... | 290/1 R |

* cited by examiner

*Primary Examiner* — Tulsidas C Patel
*Assistant Examiner* — Viet Nguyen
(74) *Attorney, Agent, or Firm* — Chun-Ming Shih

(57) ABSTRACT

A traction-type actuator includes a frame, a first actuating unit, a second actuating unit, a rotatable member and a traction member. The rotatable member is disposed on the frame. The first actuating unit and the second actuating unit are located at two sides of the rotatable member. The traction member has a strip shape and can be curved and wound. The traction member has two ends fixed to the frame and is in a tightened state. The traction member winds through the first actuating unit, and then winds on the rotatable member, and finally winds through the second actuating unit. When the first actuating unit is actuated, the second actuating unit will be towed, vice versa, the first actuating unit and the second actuating unit are push-pull by the traction member so that the rotatable member is turned clockwise and counterclockwise.

3 Claims, 2 Drawing Sheets

TRACTION-TYPE ACTUATOR

BACKGROUND OF THE INVENTION

1. Field of the Invention

The present invention relates to a traction-type actuator, and more particularly to a traction-type actuator to provide a multiple of a single route.

2. Description of the Prior Art

In these days, people have a certain demand for various electric appliances, in particular to portable electric products, such as smart phones MP3, PDA, notebook computers, digital cameras and so on. These products become essential for everyone. However, the sources to generate electric power are limited. Petrifaction source is widely used to generate power, but it is gradually exhausted and discharges carbon dioxide when generating power. How to supply electricity effectively and to conform to environment protection and energy-saving is an important issue in the industry.

A conventional actuator device is mounted in the sole of a shoe. When the user walks, a power module will be driven to generate electric power. The actuator device comprises a front bag disposed at the front of the sole, a rear bag disposed at the rear of the sole, two guide pipes each having one end connected to the front bag and the other end connected to the rear bag, a blade rotator connected to the power module, and four check valves disposed at the ends of the guide pipes. When the user walks to compress the front bag, the liquid in the front bag will push the blade rotator through the guide pipe connected with the front bag and flow to the rear bag through the other guide pipe. When the rear bag is compressed, the liquid in the rear bag will flow reversely to the front bag. The check valves are used to control the flow direction of the liquid to push the blade rotator to turn in the same direction for the power module to generate electricity. The power transmission of the actuator is achieved by the liquid. However, the liquid flows without a specific direction. It is necessary to provide the guide pipes and the check valve to control the flow direction of the liquid. In this way, partial kinetic energy is consumed on the guide pipes and the check valves to result in low efficiency of transmission of the kinetic energy. How to provide an actuator which can transmit kinetic energy efficiently is the present topic. Accordingly, the inventor of the present invention has devoted himself based on his many years of practical experiences to solve these problems.

SUMMARY OF THE INVENTION

The primary object of the present invention is to provide a traction-type actuator. Through a traction member to tow one of two actuating units located at two sides of a rotatable member, the other actuating unit is driven to operate. By the push-pull operation, the rotatable member is turned clockwise and counterclockwise to provide green energy effectively.

In order to achieve the aforesaid object, the traction-type actuator of the present invention comprises a frame, a first actuating unit, a second actuating unit, a rotatable member and a traction member. The first actuating unit comprises a first immovable member and a first movable member. The first immovable member is disposed at a first end of the frame. The first movable member is movable relative to the first immovable member. The first movable member has at least one first turning unit. The second actuating unit comprises a second immovable member and a second movable member. The second immovable member is disposed at a second end of the frame. The second movable member is movable relative to the second immovable member. The second movable member has at least one second turning unit. The rotatable member is disposed on the frame. The first actuating unit and the second actuating unit are respectively located at two sides of the rotatable member. The traction member has a strip shape and can be curved and wound. The traction member has a first connecting end fixed to the first end of the frame. The traction member winds through the at least one first turning unit and the first immovable member, and then winds on the rotatable member, and finally winds through the second immovable member and the at least one second turning unit. The traction member has a second connecting end fixed to the second end of the frame. When the first movable member is moved away relative to the first immovable member, the traction member is towed by the first movable member to extend out of the first immovable member to bring a first traction route, and the second movable member is moved to approach the second immovable member. The first movable member and the second movable member are push-pull to be actuated for the rotatable member to be turned clockwise and counterclockwise. After the first connecting end and the second connecting end are secured, the traction member is in a tightened state.

DETAILED DESCRIPTION OF THE PREFERRED EMBODIMENTS

Embodiments of the present invention will now be described, by way of example only, with reference to the accompanying drawings.

Figure 1A:
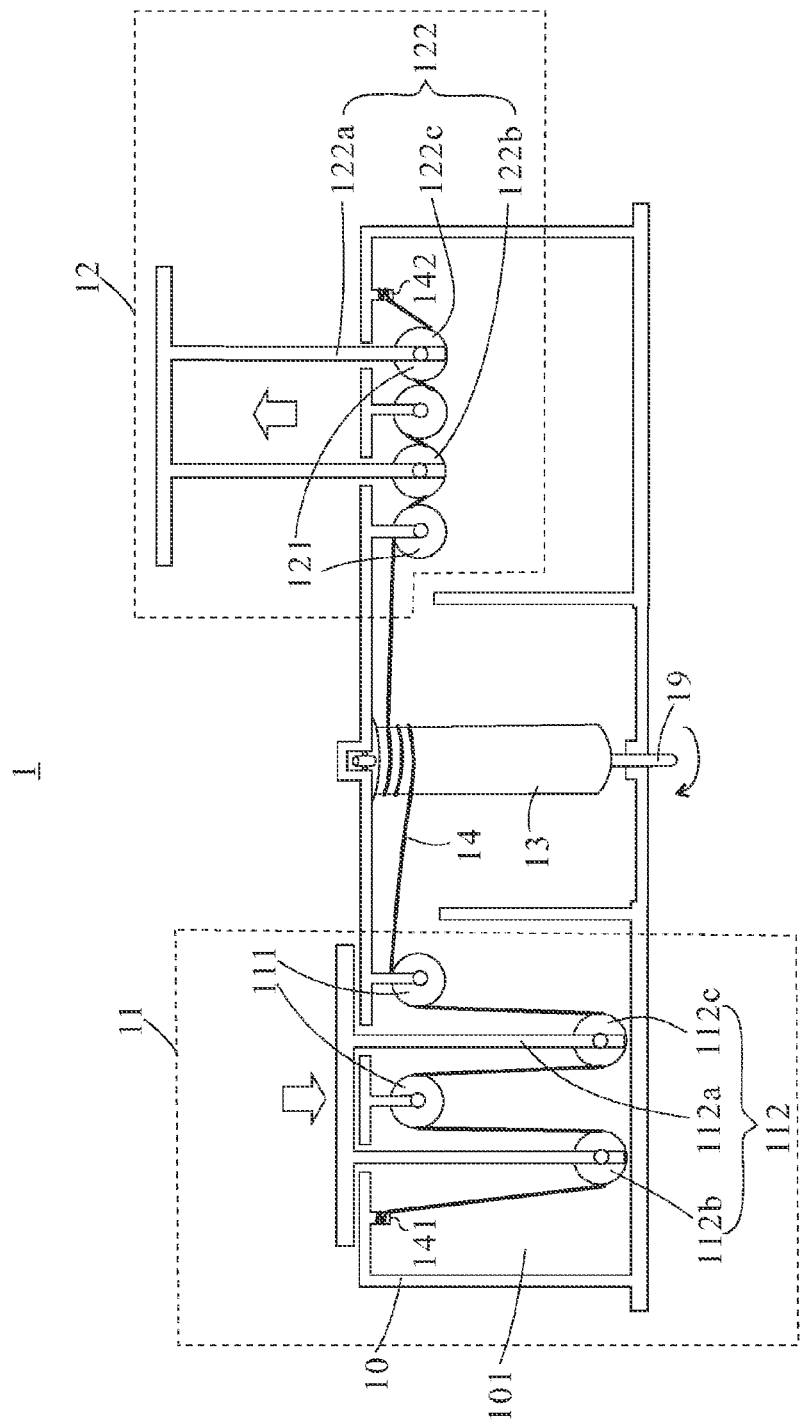
FIG. 1A is a schematic view of a preferred embodiment of the present invention in an operation state.
Figure 1B:
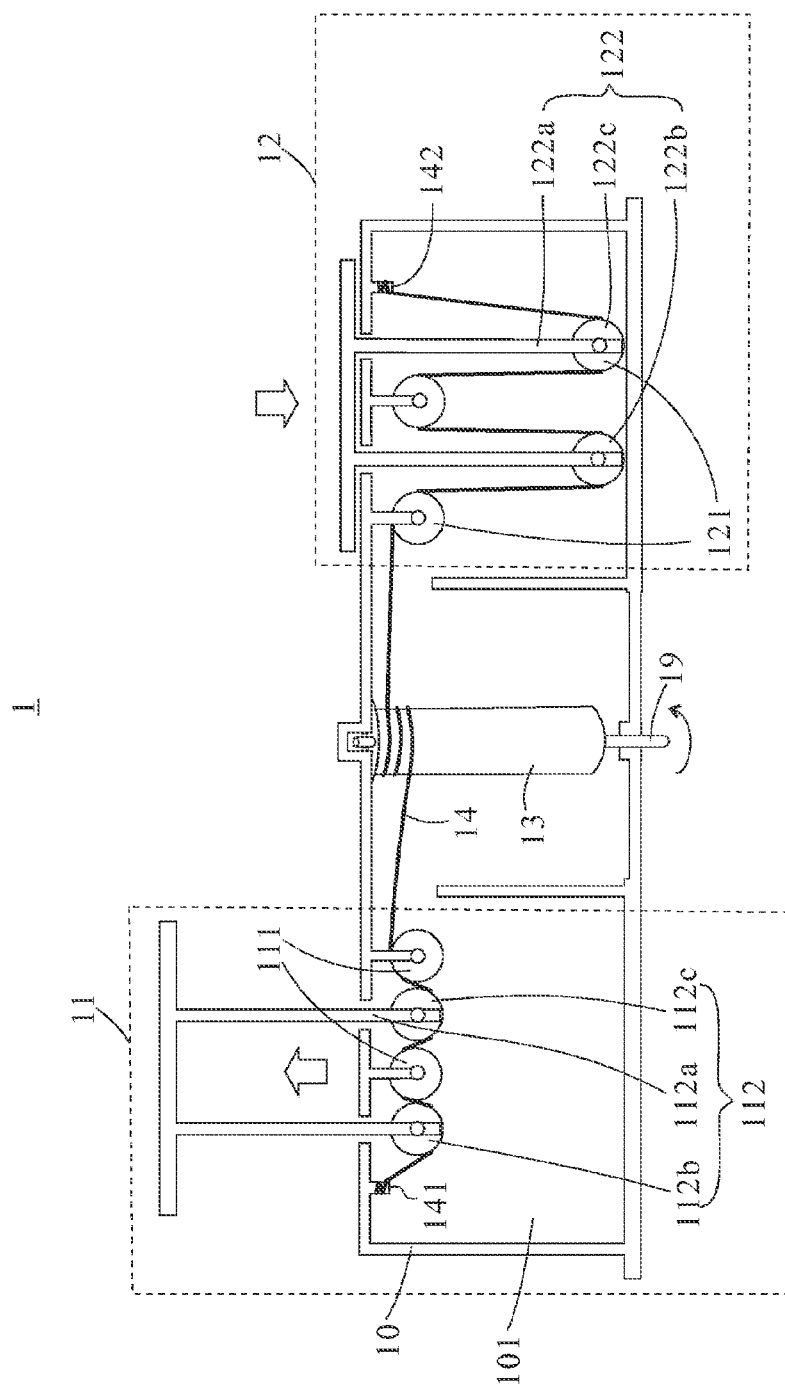
FIG. 1B is a schematic view of the preferred embodiment of the present invention in another operation state.

As shown in FIG. 1A and FIG. 1B, the traction-type actuator 1 according to a preferred embodiment of the present invention comprises a frame 10, a first actuating unit 11, a second actuating unit 12, a rotatable member 13, a traction member 14, and an output interface 19.

The frame 10 has a hollow chamber 101 therein. The first actuating unit 11, the second actuating unit 12, the rotatable member 13 and the traction member 14 are disposed in the hollow chamber 101.

The first actuating unit 11 comprises a first immovable member 111 and a first movable member 112. The first immovable member 111 is disposed at a first end of the frame 10. The first movable member 112 can be moved up and down relative to the first immovable member 111. The first immovable member 111 has two rollers. The first movable member 112 has a first support 112a and two first turning units 112b, 112c disposed at one end of the first support 112a. The number of the rollers or the first turning units can be changed for different embodiments to one of the ordinary skill in the art.

The second actuating unit 12 comprises a second immovable member 121 and a second movable member 122. The second immovable member 121 is disposed at a second end of the frame 10. The second movable member 122 can be moved up and down relative to the second immovable member 121. The second immovable member 121 has two rollers. The second movable member 122 has a second support 122a and two second turning units 122b, 122c disposed at one end of the second support 122a. The number of the rollers or the second turning units can be changed for different embodiments to one of the ordinary skill in the art. Preferably, the first actuating unit 11 and the second actuating unit 12 have the same number of the rollers and the turning units. For different embodiments of the present invention, different numbers of the rollers or the turning units can be obvious to one of the ordinary skill in the art.

The turning units and the immovable members of the aforesaid actuating units are rollers. In other embodiments of the present invention, the turning units and the immovable members are sliding rings or the equivalent having a groove or a curved end so that the traction member can be wound therebetween for slide.

The rotatable member 13 is disposed on the frame 10 and located in the center of the hollow chamber 101. The first actuating unit 11 and the second actuating unit 12 are respectively located at the left and right sides of the rotatable member 13.

The traction member 14 has a strip shape and can be curved and wound. The traction member 14 has a first connecting end 141 fixed to the first end of the frame 10. The traction member 14 winds through the first turning units 112b, 112c and the first immovable member 111, and then winds on the rotatable member 13, and finally winds through the second immovable member 121 and the second turning units 122b, 122c. The traction member 14 has a second connecting end 142 fixed to the second end of the frame 10. After the first connecting end 141 and the second connecting end 142 are secured, the traction member 14 is in a tightened state. Preferably, the traction member 14 is embedded on the rotatable member 13, like winding around a reel. The traction member 14 winds on the smaller central portion of the rotatable member 13.

As shown in FIG. 1A, when the first movable member 112 is moved away relative to the first immovable member 111, the traction member 14 is towed by the first movable member 112 to extend out of the first immovable member 111 to bring a downward first traction route, and the second movable member 122 is driven to move upward to approach the second immovable member 121. On the contrary, as shown in FIG. 1B, when the second movable member 122 is moved away relative to the second immovable member 121, the traction member 14 is towed by the second movable member 122 to extend out of the second immovable member 121 to bring a downward second traction route, and the first movable member 112 is driven to move upward to approach the first immovable member 111. The first movable member 112 and the second movable member 122 are push-pull to be actuated so that the rotatable member 13 is turned clockwise and counterclockwise.

The output interface 19 is connected with the rotatable member 13 and located out of the frame 10. The output interface 19 outputs the power generated by the rotator 13 during traction to a generator device (not shown). The rotator 13 is coupled to the generator device.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A traction-type actuator, comprising:
a frame forming an accommodating space therein;
a first actuating unit comprising a first immovable member and a first movable member, the first immovable member being disposed at a first end of the frame and being accommodated in the accommodating space, the first movable member being movable relative to the first immovable member, the first movable member having at least one first turning unit;
a second actuating unit comprising a second immovable member and a second movable member, the second immovable member being disposed at a second end of the frame and being accommodated in the accommodating space, the second movable member being movable relative to the second immovable member, the second movable member having at least one second turning unit;
a rotatable member disposed on the frame in the accommodating space, the first actuating unit and the second actuating unit being respectively located at two sides of the rotatable member; and
a traction member, the traction member having a strip shape and being able to be curved and wound, the traction member having a first connecting end fixed to an interior surface of the first end of the frame, the traction member winding through the at least one first turning unit and the first immovable member and then winding on the rotatable member and finally winding through the second immovable member and the at least one second turning unit, the traction member having a second connecting end fixed to the interior surface of the second end of the frame;
wherein, when the first movable member is pushed by an outer force to moved away relative to the first immovable member, the traction member is towed by the first movable member to extend out of the first immovable member to bring a first traction route, and the second movable member is thus pushed by the traction member to approach the second immovable member; when the second movable member is pushed by the outer force to moved away relative to the second immovable member, the traction member is towed by the second movable member to extend out of the second immovable member to bring a second traction route, and the first movable member is thus pushed by the traction member to approach the first immovable member; therefore, the first movable member and the second movable member are push-pull to be actuated for the rotatable member to be turned clockwise and counterclockwise, after the first connecting end and the second connecting end are secured, the traction member is in a tightened state;
wherein the outer force is applied to the first movable member or the second movable member in a first direction which is substantially vertical to a second direction that the traction member extends toward the first immovable member or the second immovable member from the rotatable member.

2. The traction-type actuator as claimed in claim 1, wherein the traction member is embedded on the rotatable member.

3. The traction-type actuator as claimed in claim 1, wherein the first and second turning units are sliding rings or rollers.

* * * * *